United States Patent [19]

Häfner

[11] Patent Number: 4,662,217

[45] Date of Patent: May 5, 1987

[54] METHOD AND APPARATUS FOR MEASURING MOMENTS ACTING UPON AN OBJECT UNDER MEASUREMENT

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 832,934

[22] Filed: Feb. 26, 1986

[30] Foreign Application Priority Data

Mar. 6, 1985 [DE] Fed. Rep. of Germany ....... 3507957

[51] Int. Cl.$^4$ .............................................. G01M 9/00
[52] U.S. Cl. ...................................... 73/147; 73/862.04
[58] Field of Search ............................ 73/147, 862.04; 33/203.12, 203.13

[56] References Cited

U.S. PATENT DOCUMENTS

3,780,573 12/1973 Reus .................................... 73/862.04
4,073,188 2/1978 Slezinger et al. ...................... 73/147
4,522,074 6/1985 Hafner ................................. 73/147

Primary Examiner—Donald O. Woodiel
Attorney, Agent, or Firm—Armstrong, Nikaido, Marmelstein & Kubovcik

[57] ABSTRACT

A method and apparatus for measuring at least one moment acting about a predetermined axis on an object under investigation. A force component acting at a first force introduction point onto said object under investigation perpendicular to a normal from said first introduction point to said axis is measured. Then a differential moment caused by displacement of said object between said first force introduction point to a present second force introduction point is determined and said displacement is calculated by dividing said differential moment by said measured force component. A predetermined distance between said first force introduction point is corrected by said displacement and finally said measured force component is multiplied by said corrected distance in order to gain an accurate value for the moment to be measured.

20 Claims, 10 Drawing Figures

METHOD AND APPARATUS FOR MEASURING MOMENTS ACTING UPON AN OBJECT UNDER MEASUREMENT

FIELD OF THE INVENTION

The invention relates to a method and an apparatus for measuring moments acting upon an object under measurement and in particular to a method and an apparatus for use in a wind tunnel for determining aerodynamic properties of an object in an air flow.

BACKGROUND OF THE INVENTION

The journal "SENSE", volume 8, number 5, Sept./Oct. 82, pages 2/3 discloses a measuring apparatus for use in a wind tunnel which, in addition to measuring the four vertical forces acting upon the wheels of an automobile, by using the distance apart of the axles and the distance apart of the wheels along each axle can measure the tilting and rolling moments (Mx, My). Such known measuring apparatus is manufactured and sold by the assignee of the present invention. The advantage of such an object-related measurement is that the actual wheel forces are measured and that a displacement during the measuring operation does not result in a change in the reading. In this connection it is disadvantageous that the distance apart $a_1$ of the axles and the distance apart $a_2$ of the wheels along each axle are not exactly defined in view of the area of the tire surface contacting the supporting surface and variations in manufacture.

In particular, it may happen that the actual force introduction point below each wheel does not correspond with the position of the force transmission member for transmitting the force to a known force measuring element. Furthermore, forces acting onto the object in an air flow may cause a displacement of the object, which again result in a change of the distance between the actual force introduction point and the positioned force introduction point. Such displacements falsify the readings for the tilting and rolling moments (Mx, My).

Alternatively, an apparatus-related measurement of the moments Mx, My may be performed where in the example of a wind tunnel for automobiles one column each for each of the four wheels are arranged at the corners of a rectangle each column bearing at its upper end a double eccentric arm. The columns are connected to each other by a rigid frame. For determining the tilting and rolling moments Mx, My as a moment arm the corresponding distances between two columns $b_1$ and $b_2$ are used (see FIG. 1). Hence the influences of a displacement of the force introduction points may be reduced; however, upon application of forces onto the automobile a displacement of the car body in respect of the under frame comprising the motor and the wheels may occur, which displacement results in displacement of the actual centre of gravity in turn resulting in a falsification of the readings of the measurement.

SUMMARY OF THE INVENTION

It is an object of the present invention to provide a method and an apparatus for measuring moments acting upon an object with increased measuring accuracy.

It is a further object of the present invention to provide a method and an apparatus for measuring the tilting and rolling moments acting upon an object placed in a wind tunnel.

It is still a further object of the present invention to provide a method and an apparatus for measuring the tilting or rolling moment under consideration of any displacement between the adjusted force introduction point and an actual force introduction point.

These and other objects are achieved by measuring a force component acting at a first force introduction point onto said object under investigation perpendicular to a normal from said first introduction point to said axis; measuring a differential moment caused by displacement of said object between said first force introduction point and an actual second force introduction point; calculating said displacement by dividing said differential moment by said measured force component; correcting a predetermined distance value between said axis and said first force introduction point by said displacement and multiplying said measured force component by said corrected distance value.

Furthermore, the invention provides an apparatus for measuring first and second moments acting on an object under investigation in a flowing medium about two axes angularly displaced with respect to each other including a plurality of force introduction plates spaced apart with respect to each other in one plane and arranged to have the object under measurement placed thereon, a plurality of guide members respectively associated with said force introduction plates and supported on a base, each guide member being arranged to guide a respective force transmission member in a direction substantially perpendicular to said one plane, an upper part of each force transmission member being connected to the associated force introduction plate, and a lower part of each force transmission member acting on a respective force measuring device, and a rigid frame which connects together said guide members so as to maintain a fixed positional relationship of said guide members with respect to each other, said guide members being attachable to said base, and said force transmission members being movabled relative to said guide members in a first mode of operation, and said guide members being releasable from said base for movement relative thereto and being respectively attachable to said force transmission members for movement therewith in a second mode of operation.

BRIEF DESCRIPTION OF THE DRAWINGS

Embodiments of the present invention will now be described by way of example with reference to the accompanying drawings, in which.

Figure 1:
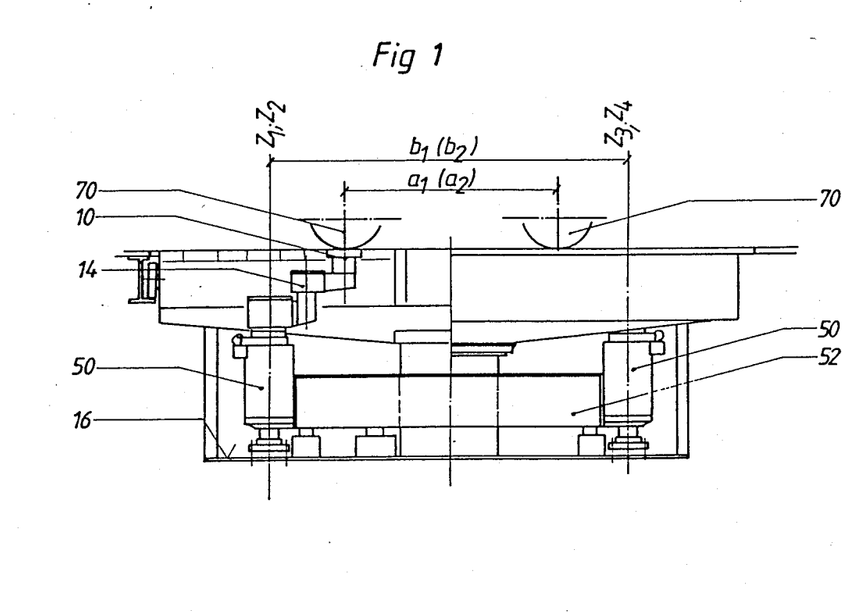
FIG. 1 is an elevational view, with part of a side wall shown broken away, of a measuring apparatus for use in a wind tunnel.

FIG. 1 shows an overall view of a measuring apparatus in acordance with the invention for use in a wind tunnel. Four columns 50 are mounted on a rectangular base 16 adjacent the corners thereof, each column 50 being provided with a double eccentric arm 14. Each double eccentric arm 14 comprises a first arm pivotably mounted at one end and a second arm one end of which is pivotably mounted on the other end of the first arm. The four columns 50 are connected to each other by a rigid frame 52 such that the distances of their axes from each other, i.e. $b_1$ in the plane of FIG. 1 and $b_2$ perpendicular to the plane of FIG. 1 may be exactly defined as is explained in more detail in connection with FIGS. 8 to 10.

By means of the double eccentric arms 14 four force introduction plates 10 which respectively support wheels 70 of a vehicle under investigation in the wind tunnel, may be adjusted in position according to the distances apart of the wheels and the axles. The distance apart of the axles is designated by $a_1$ and the distance apart of the wheels along each axle is designated by $a_2$ Considering the verticle components $Z_1$, $Z_2$, $Z_3$, $Z_4$ acting through the individual wheels 70, the tilting moment Mx is as follows:

$$Mx = ((Z_1 + Z_2) - (Z_3 + Z_4)) \times a_1$$

The rolling moment My is as follows:

$$My = ((Z_1 + Z_3) - (Z_2 + Z_4)) \times a_2$$

This is for an object-related measurement in which the distance apart of the wheels along each axle and the distance apart of the axles of the vehicle are taken into account.

With a different design of the connection between the columns 50 and the frame 52, an apparatus-related measurement of the moments Mx, My, in which the distances apart of certain parts of the apparatus itself (the axes of the columns 50) are taken into account, and may be performed according to the following equations:

$$Mx = ((Z_1 + Z_2) - (Z_3 + Z_4)) \times b_1$$

$$My = ((Z_1 + Z_3) - (Z_2 + Z_4)) \times b_2$$

Figures 2, 3:
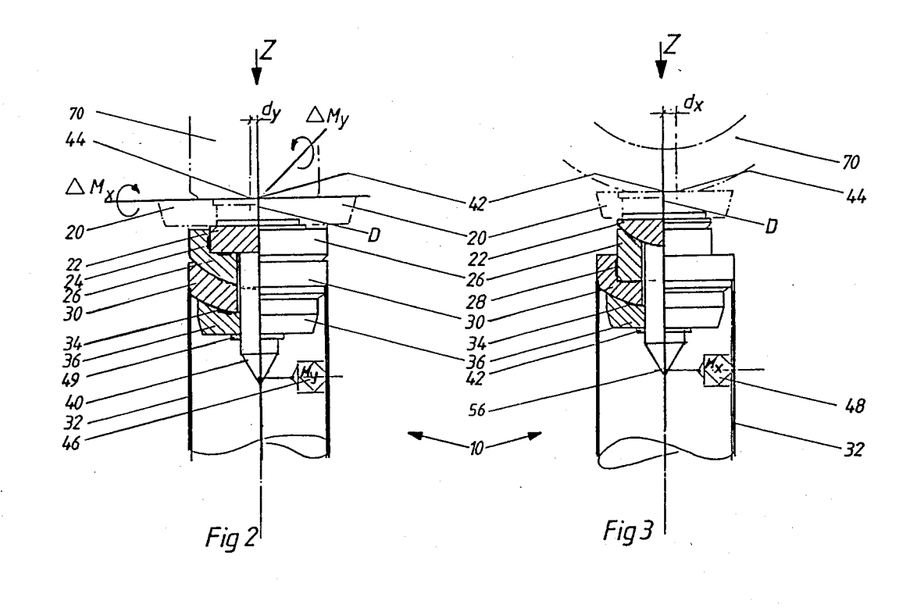
FIG. 2 is an enlarged elevational view, partly in section of a first embodiment of a force introduction transmission and measuring means for use with the apparatus in FIG. 1.
FIG. 3 is an elevational view partly in section of the means shown in FIG. 2 viewed in a direction perpendicular to that of FIG. 2.

FIGS. 2 and 3 show a first embodiment of the appartus according to the invention in particular means for compensating any displacement between the force introduction point set by positioning the double eccentric arms 14 and the actual force introduction point formed by the tyres of the vehicle. In particular, FIGS. 2 and 3 show views perpendicular to each other of the upper member 10 (FIG. 1) of one of the double eccentric arms 14. Of course, each of the double eccentric arms 14 has a similar design.

The wheel 70 is placed on a force introduction plate 20 having an assumed actual force introduction point 44 whilst the set force introduction point achieved by adjustment of the double eccentric arm 14 is designated 42. The force introduction plate 20 is fixed to a plain surface of a cylindric section 22 the virtual axis extending through the set force introduction point 42. The curved surface of the cylindrical section is mounted essentially frictionless by means of a hydrostatic bearing 24 in a further cylindrical section 26 whose in turn central axis is perpendicular to the axis of the cylindrical section 22 extending through the set force introduction point 42. The lower convex surface of the cylindrical section 26 is in turn mounted essentially frictionless in a corrésponding upper cylindrical concave recess of a spheric section 30 by means of a hydrostatic bearing 28. The spheric section 30 is supported by a tubular member 32 of the support part 10 of the double eccentric arm 14. On the other hand, its lower convex spheric surface is, via hydrostatic bearings 34 in engagement with a biassing elements 36.

The cylindrical section 26, the spheric section 30 and the biassing element 36 are provided each with a central bore aligned with a vertical axis through the set force introduction point 42 a column 40 being inserted along this central axis into the bore which column is fixed to the lower side of the cylindrical section 22. The lower end of the column 40 is connected with two force measuring elements 46 and 48 arranged perpendicularly to each other by means of a link each which force measuring elements are mounted at the inner surface of the tubular member 32. By means of a fastening device 49 exemplary a threaded ring or a clip the elements 22, 26, 30 and 36 arranged on top of each other are biassed against each other without any slackness.

The cylindrical sections 22 and 26 having virtual central axes mutally perpendicular to each other comprise a bearing system which is essentially frictionfree and retroactivefree in the X and Y directions. The column 40 has enough clearance in the bore extending through the bearing elements to transmit largest possible displacements of the actual force introduction point 44 in respect to the set force introduction point 42, which displacements are designated dx and dy, to force measuring elements 46 and 48 without any retroaction.

In the following the functional principle and the operation resulting therefrom shall be explained.

When placing an object in particular an automobile onto the force introduction plates 20 as well as upon application of forces onto the object under measurement in particular when applying a flowing medium displacements may occur in respect of the set force introduction point 42 the coordinates of which are also set in the computing system for calculating the tilting and rolling moments Mx and My. Such displacements result with a vehicle having its driving system blocked from the resistance forces of the wind profile. Further displacements may be effected by the mass of the vehicle, the distribution thereof to the axles and the wheels as well as the under-frame where the latter may be considered to represent all influences of the tyres, the steering elasticity and the spring characteristics. When determining the tilting and rolling moments Mx and My, respectively, such displacements between the set force introduction point 42 and the actual force introduction point 44 causes changes in the moment arms. Thus, the resulting values for Mx and My will be inexact. By means of the method and the apparatus according to the invention and the displacements dx and dy will be determined in very simple manner and will be considered in the computation of Mx and My.

The functional principle of the apparatus according to the invention may be gathered from the equation $$M = F \times d \quad (1)$$

where generally M is the moment, F is a force and d is the distance between the point of force application and the point of rotation.

Consequently, $$d = M/F \quad (2)$$

Applied to the present case the displacement of the force introduction point 44 in respect of the point 42 results in moment arms dx and dy, respectively. If the vertical force exerted by an individual wheel of the vehicle onto the force introduction plate 20 is Z and moments Mx and My are measured by the force measuring elements 46 and 48, respectively, then the displacements may be calculated from equation (2) as follows:

$$dx = Mx/Z \quad (3)$$

$$dy = My/Z \quad (4)$$

It should be noted that the force Z may be determined before application of any flowing medium onto the object under measurement.

It should further be mentioned that it is known to a person skilled in the art to determine moments My and Mx by using the forces measured by the force measuring elements 46 and 48 and the arm D between the set force introduction point 42 and the connection junction 56 of the force measuring elements.

In detail the method for determining the tilting and rolling moments is as follows:

The vehicle is placed as exact as possible with its wheels 70 onto the force introduction plates 20, such that dx and dy are as small as possible in rest position. Now, the vertical force Z is determined in well-known manner for the individual wheels. The values of Z are then transmitted to the computing system as well as the forces measured by the force measuring elements 46 and 48. The computing system the application of which in connection with force measuring apparatuses of the type of the invention is known in the art determines the moments $\Delta Mx$ and $\Delta My$. The resulting values of $\Delta Mx$ and $\Delta My$ are used then to calculate dx and dy which values are then taken into consideration when computing the actual moments Mx and My by amending $a_1$, $a_2$ or $b_1$ and $b_2$ accordingly. When using the apparatus according to the invention in a measuring system which is apparatus-related, i.e. when the four columns 50 are rigidly connected by frame 52 the displacements dx and dy as determined above may be used to calculate the displacement of the centre of gravity of the vehicle and to take it into account when calculating moments and forces acting upon the vehicle in air stream by the computing system.

The forces $Z_1$ to $Z_4$ are usually measured by force measuring elements 130 (FIG. 4) arranged between the base 16 and a force transmission member 118 which is guided in the tubelike column 50 essentially frictionlessly and the top side of which is connected to the lower end of the double exentric arm 14 bearing the force introduction plate 10. According to the invention the means for measuring force Z may be simplyfied in a manner as shown in the second embodiment according to FIGS. 4 and 5. The improvement particularly pertains the specific design of the column 40 and its mounting. Thus all elements which have the same function as with the first embodiment according to FIGS. 2 and 3 are designated with the same reference numeral and are not further explained.

As compared with the first embodiment according to the FIGS. 2 and 3 column 40 is replaced by a support unit 60 including a tube 62 in which a column 64 is slidably and frictionlessly guided. Tube 62 has its lower end closed preferably by means of a housing 66 enclosing a force measuring element 71 for the vertical force Z. The upper end of the tube 62 is secured to the upper cylindrical section 72 in the same manner as column 40 of the first embodiment. However, cylindrical section 72 corresponding to the cylindrical section 22 of the first embodiment is provided with a central bore for slidably and frictionlessly receiving column 64 which upper end bears a plate 74 preferably at least partially inserted into the upper cylindrical section 72 and which supports the force introduction plate 20. Between the lower surface of plate 74 and the upper cylindrical section 72 there is sufficient clearance sucht that the column 62 may act upon the force measuring element 71 without engagement with the cylindrical section 72.

Figure 4:
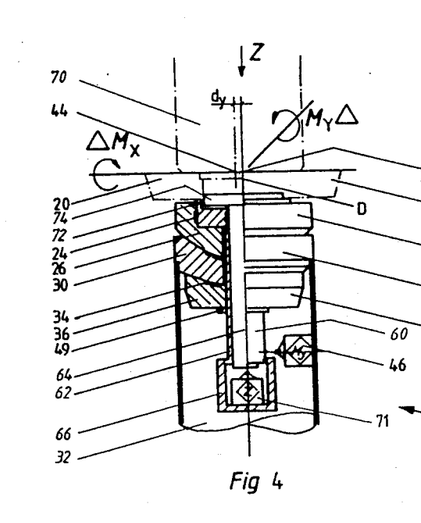
FIGS. 4 and 7 are elevational views similar to those of FIGS. 2 and 3 of second and third embodiments of respectively of the apparatus of the present invention.
Figure 5:
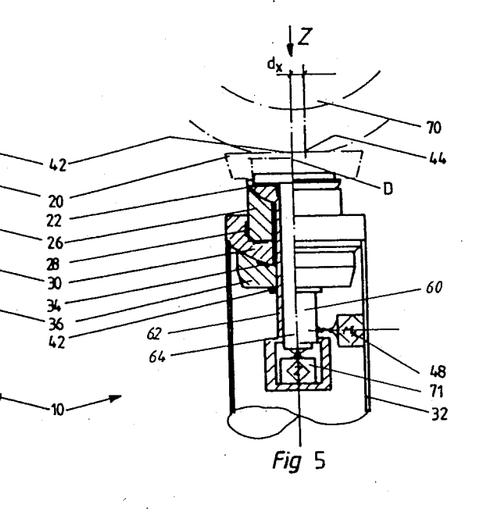

It should be noted that the frictionless mounting of column 64 in the tube 62 may be achieved by hydrostatic bearings in the same manner as the provision of hydrostatic bearings 24 between the elements 72, 26, 30 and 36. The force measuring elements 46 and 48 are secured to the outer surface of the tube 62; thus, they are not affected by the very minor vertical movement of column 64 upon application of force Z in direction of the force measuring element 71.

It is apparent that in view of the very close arrangement of the force measuring element 71 for the force Z in respect of the force introduction plate the measurement of the force Z is simplyfied considerably combined with increased accuracy in view of the short force transmission distance.

With the first and second embodiment according to FIGS. 2 and 3 and FIGS. 4 and 5, respectively, two cylindrical sections 22 and 26 having mutually perpendicular central axes to each other are used in order to permit a frictionless movement in X and Y directions. Alternatively, the two cylindrical sections may be replaced by a spheric section. In this case it should be ensured that the spheric section is prevented from a rotational movement about a vertical axes.

Figure 6:
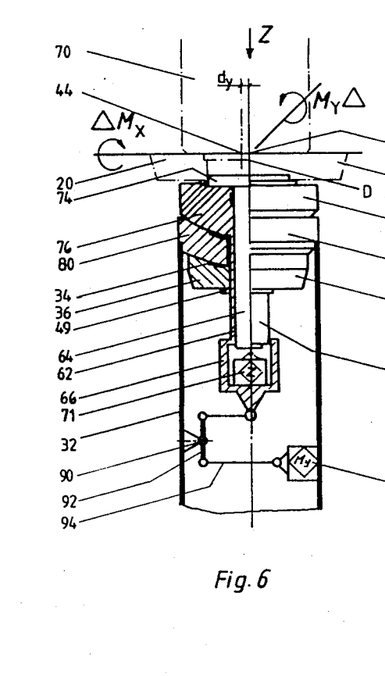
Figure 7:
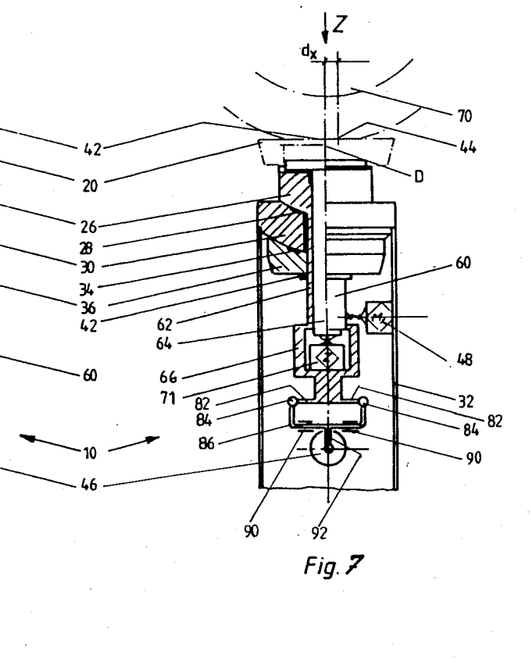

FIGS. 6 and 7 show a third embodiment of the apparatus according to the invention implementing such a design as compared with the embodiment of FIGS. 4 and 5 the two cylindrical sections 72 and 26 are replaced by a spheric section 76 which spheric lower surface is supported by hydrostatic bearings in a spheric recess of a second spheric section 80 corresponding to section 30 of the first and second embodiments. In order to prevent a rotational displacement of the spheric section 76 the connection of the support unit 60 to at least one of the force measuring elements for the horizontal direction, exemplary force measuring element 46 for the Y direction is connected to the lower end of the support unit 60 preferably by a lever and link arrangement as illustrated in FIGS. 6 and 7.

In particular the lower end of the housing 66 is provided with horizontal extensions 82 ending in a pivotal link 84 to which the free ends of a bracket 86 are connected. The central base part 88 of the bracket 86 is pivotally mounted in bearings 90 secured to the inner surface of the tubelike element 32.

A central point of the base part 88 is provided with an extension 92 preferably projecting from that base part 88 perpendicularly. At the free end of the projection 92 one end of the lever 94 is pivotally connected whilst its other end is connected to the force measuring element 46.

Whilst the apparatus according to the invention has been explained in connection with a measuring device for use in a wind tunnel other fields of application are feasable. Whenever an exact alignment of an object under measurement in respect of a set force introduction point is not or only with difficulty possible and/or where upon exertion of a force a displacement of the force introduction point occurs the apparatus according to the invention is of particular use.

As mentioned earlier in connection with the description of FIG. 1 measuring apparatuses have become known which perform an object-related measurement whilst other measuring apparatuses have become known for an apparatus-related measurement.

According to another aspect of the present invention a measuring apparatus is disclosed which is adapted to perform both an object-related and an apparatus-related measurement in an extremely simple manner. Such a measuring apparatus is of particular use in connection with a measuring apparatus according to FIGS. 1 to 7.

Figure 8:
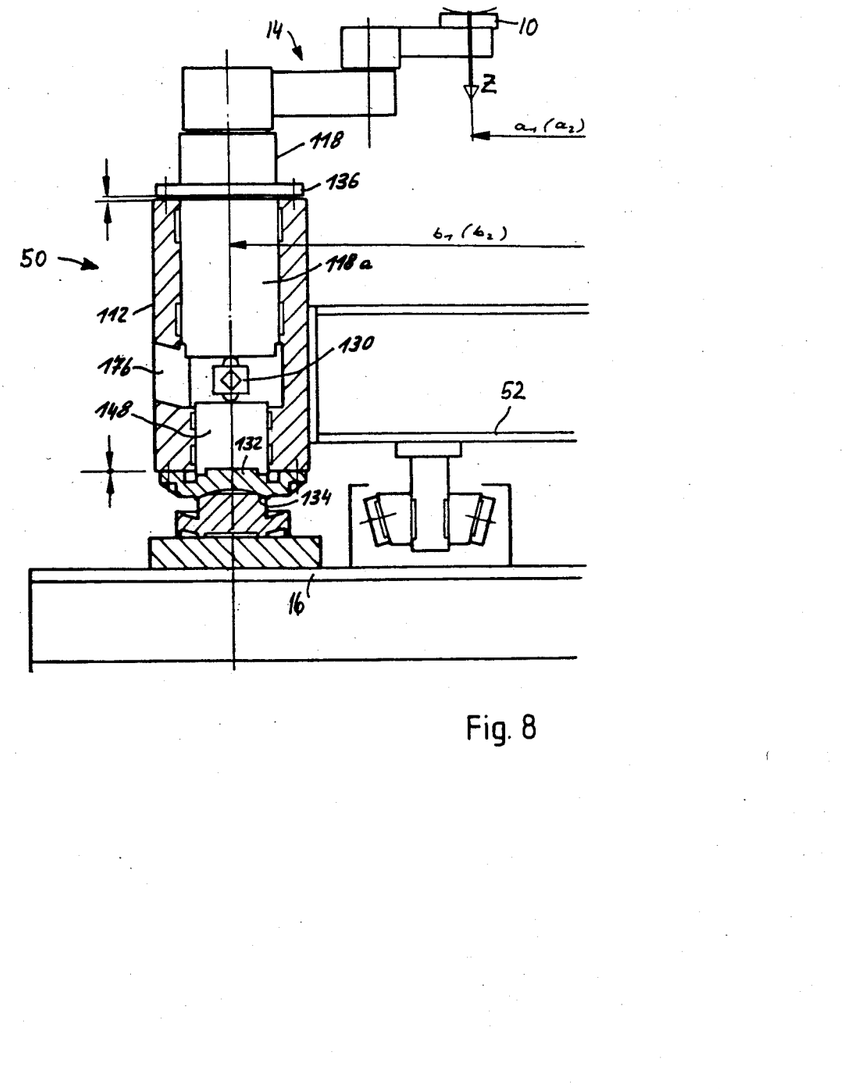
FIGS. 8 to 10 are elevational views, partly in section, of embodiments of the support means for the double eccentric arm used in connection with the invention.
Figure 9:
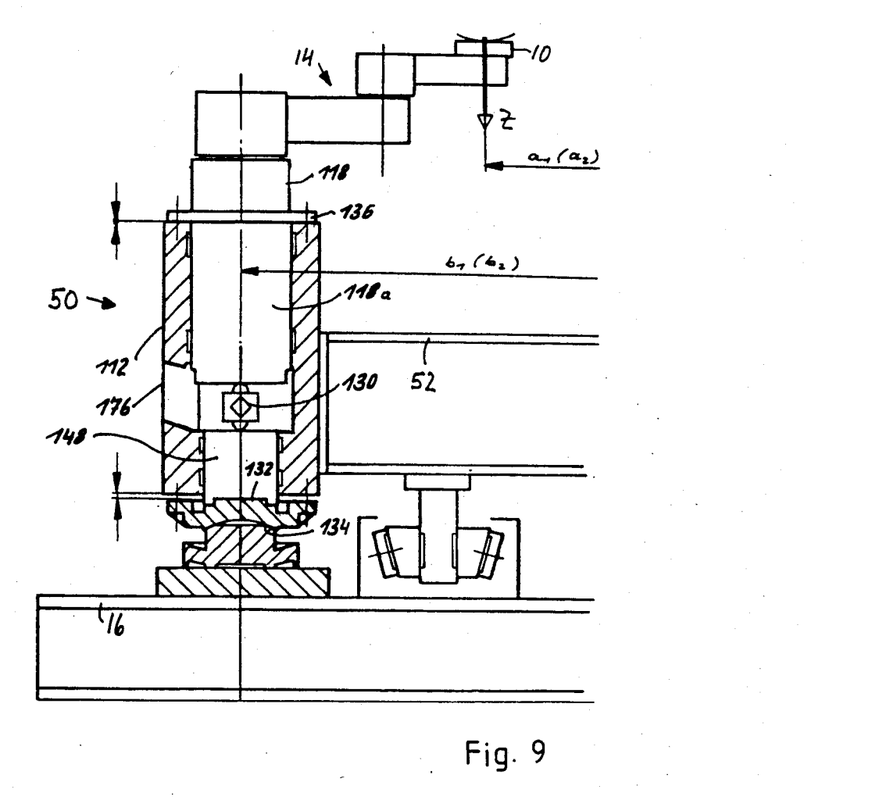

FIGS. 8 and 9 show a first embodiment of the specific design of columns 50 according to the invention. A guide member 112 freely guides for movement in a vertical direction a force transmission member generally designated 118, the upper end of the member 118 supporting a respective double eccentric arm 114 which via a respective force introduction plate 110 supports a wheel 70 of the vehicle under investigation. By means of the double eccentric arm 14 the position of the force introduction plate 10 may be adjusted in accordance with the distance of the axles and the distance apart of the wheels along each axle of the vehicle. The force transmission member 118 acts on a respective force measuring device known per se, i.e. a force measuring cell 130 which may be a strain gauge device or a piezoelectric pressure sensor. The measuring cell 130 bears against the base 16 via intermediate elements.

As shown in FIG. 8, the guide member is in the form of a hallow cylinder 112, while the force transmission member 118 has a piston 118a which, via a hydrostatic bearing, is guided in the hollow cylinder 112. Between the force measuring cell 130 and the base 16 there is a further piston 148 arranged within a hydrostatic bearing in the hallow cylinder 112. The piston 148 is supported by a base plate 132 the lower side of which is preferably in the form of a hydrostatic spherical cap type bearing 134 which is mounted on the base 16. With the mode of operation shown in FIG. 2, the hallow cylinder 112 is securely attached at its lower end to the base plate 132, preferably by being screwed thereon or clamped thereto. A flange 136 on the force transmission member 18 above the piston 18a is spaced a short distance from the upper face of the hollow cylinder 112 so that the piston 118a may be freely moved in a vertical direction.

The force Z acting through the wheel 70 upon the force introduction plate 10 is directly transmitted through the double eccentric arm 14 and the piston 118a to the force measuring cell 130, such that the individual force Z may be exactly measured by the object-related measurement.

FIG. 9 shows the apparatus-related mode of operation where the lower end of the hallow cylinder 112 is released from the base plate 132 and is spaced a short distance from the latter whilst the upper end of the hallow cylinder 112 is securely attached to the flange 136, for instance by being screwed thereon or clamped thereto.

In view of the rigid connection of the guide members 112 through frame 52, the moment distances $b_1$, $b_2$ are effective which are exactly defined and which therefore result in exact tilting and rolling moments $M_x$, $M_y$.

Figure 10:
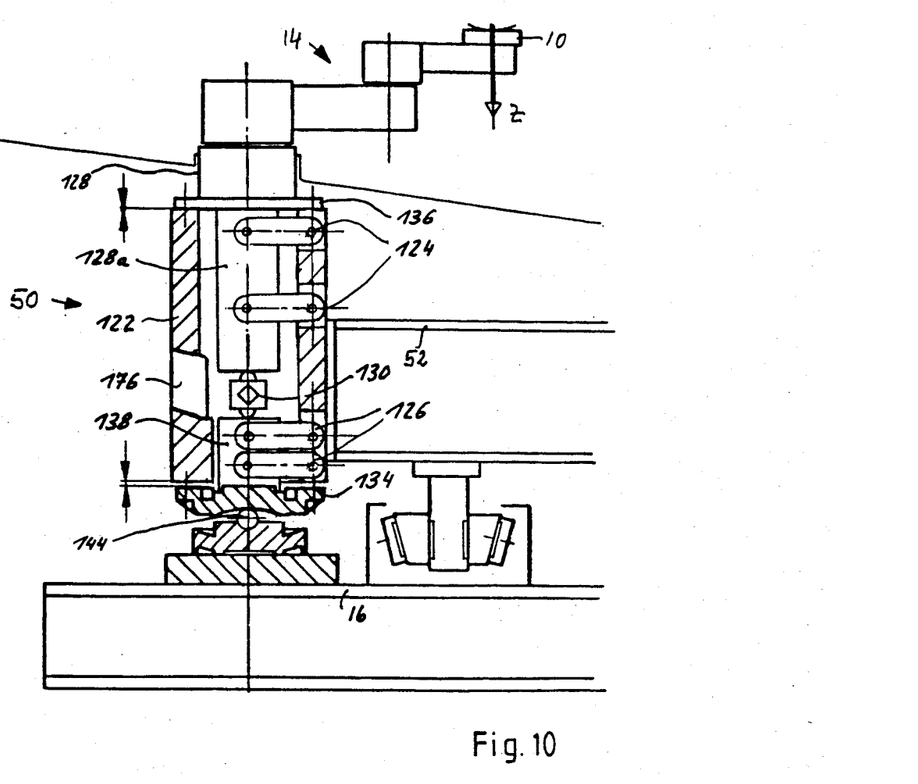

FIG. 10 shows a second embodiment of the design of a column 50 according to the invention.

In this modification, as compared with the embodiment of FIGS. 8 and 9, each hydrostatic bearing is replaced by a parallel lever arrangement. For this purpose a force transmission member 128 is provided with a support portion 128a whose lower end acts upon the respective force measuring cell 130. The support portion 128a is connected to the respective guide member 122 by means of a pivotally attached parallel lever pair 124, resulting in vertical guidance of the support portion 128a.

In similar manner, a lower support element 138 is arranged between the force measuring cell 130 and the base plate 134 which support element is connected to the guide member 122 by a pivotally attached lever pair 126, resulting in vertical guidance of the element 138. Also, the spherical cap type bearing 134 of the embodiment of FIGS. 8 and 9 is replaced by a ball bearing 144 so as to provide a point-like bearing relative to the base 16. The mode of operation shown in FIG. 10 corresponds to that of FIG. 9 i.e. an apparatus-related measurement.

Though the guide members 112, 122 are shown to have a cylindrical shape, any other form may be used, the only requirement being that guidance in the vertical direction should be as frictionless as possible. With the embodiments described above there is a direct action upon each force measuring cell 130. Instead of measuring cell between the parts 118a and 148 or 128, respectively, a hydrostatic wedge may be provided which acts upon a force measuring cell arranged outside the guide members 112, 122. For this purpose, an opening 176 is provided.

I claim:

1. A method for measuring at least one moment acting about a predetermined axis on an object placed on a force measuring apparatus comprising the steps:
   (a) measuring a force component causing said moment to be measured and acting at a first force introduction point onto said force measuring apparatus at a predetermined normal distance from said axis;
   (b) measuring a differential moment caused by displacement of said object from said first force introduction point to an actual second force introduction point;
   (c) calculating said displacement by dividing said differential moment by said measured force component;
   (d) correcting a predetermined distance value between said axis and said first force introduction point by said displacement; and
   (e) multiplying said measured force component by said corrected distance value.

2. The method of claim 1 wherein for measuring two moments acting upon axes intersecting each other corresponding displacements are determined by using said measured force component.

3. The method of claim 1 wherein said differential moment is determined by measuring a differential force caused by said differential moment at a predetermined distance from said second force introduction point.

4. An apparatus for measuring at least one moment acting about an axis on an object under investigation comprising
   (a) Means for measuring a force component causing said moment, said means having a predetermined force introduction point for said force component, said predetermined force introduction point having a predetermined distance from said axis;

(b) means for measuring a differential moment caused by a displacement of said object from said predetermined force introduction point to an actual force introduction point, said differential moment acting about an axis running through said predetermined force introduction point and being caused by said force component;

(c) means for determining from said differential moment a displacement between said predetermined force introduction point and said actual force introduction point;

(d) means for correcting the value of said predetermined distance between said axis and said predetermined force introduction point by said displacement; and (e) means for determining said at least one moment by multiplying said measured force component by said corrected value of said predetermined distance.

5. The apparatus of claim 4 wherein said predetermined force introduction point and said actual force introduction point are located at the upper surface of a force introduction plate which is essentially frictionlessly pivotally mounted on a support means and said force introduction plate is connected via a lever means with a force measuring element the operating direction thereof being perpendicular to said of that force component.

6. The apparatus of claim 5 wherein said force introduction plate is mounted pivotally in two directions about two axes mutually offset to each other and that there is provided a force measuring element each acting in the one and the other directions, respectively.

7. The apparatus of claim 6 wherein means are provided to prevent said force introduction plate from rotation about an axis extending parallel to the direction of said force component.

8. The apparatus of claim 7 wherein said force introduction plate is arranged on a member having a downwards directed spherical section which section is supported on said support means via hydrostatic bearing means, a supporting surface of said support means having a spherical shape corresponding to that of said lower section of said support member.

9. The apparatus of claim 8 wherein said force introduction plate is pivotally mounted by means of two cylindrical section means arranged on top of each other and having central axes mutually perpendicular to each other intersecting at said predetermined force introduction point and hydrostatic bearing means are provided between said two cylindrical section means and between the lower of said two cylindrical section means and said support means.

10. The apparatus of claim 9 wherein said lower cylindrical section means is via hydrostatic bearing means supported by a support member having an upper recess corresponding to a cylindrical lower surface of said lower cylindrical section means and having a lower spheric surface being in engagement with a biassing element via hydrostatic bearing means, said biassing element being secured to bar means connected to said lower surface of the upper of said cylindrical section means and extending through said lower cylindrical section means and said support member, a lower portion of said bar means being connected to said force measuring element.

11. The apparatus of claim 10 wherein said bar means comprises a tubular member connected to said lower surface of the upper of said cylindrical section means and a bar member slidably mounted in said tubular member, said bar member acting upon a force measuring element in the direction of said force component, said force measuring element being supported at a lower end of the interior of said tubular member.

12. The apparatus of claim 5 wherein said force introduction plate, via said lever means acts upon a force measuring element in the direction of said force component.

13. The apparatus of claim 12 wherein said lever means comprises a tubular member supporting at its lower interior end said force measuring element for said force component and having slidably mounted therein a bar member supporting said force introduction plate.

14. An apparatus for measuring first and second moments acting on an object under investigation in a flowing medium about two axes angularly displaced with respect to each other including a plurality of force introduction plates spaced apart with respect to each other in one plane and arranged to have the object under measurement placed thereon, a plurality of guide members respectively associated with said force introduction plates and supported on a base, each guide member being arranged to guide a respective force transmission member in a direction substantially perpendicular to said one plane, an upper part of each force transmission member being connected to the associated force introduction plate, and a lower part of each force transmission member acting on a respective force measuring device, and a rigid frame which connects together said guide members so as to maintain a fixed positional relationship of said guide members with respect to each other, said guide members being attachable to said base, and said force transmission members being movable relative to said guide members in a first mode of operation, and said guide members being releasable from said base for movement relative thereto and being respectively attachable to said force transmission members for movement therewith in a second mode of operation.

15. The apparatus of claim 14, wherein said guide members are each of cylindrical shape, and said force transmission members each include a piston portion which is guided within the associated guide member by means of a hydrostatic bearing.

16. The apparatus of claim 14, wherein each force transmission member is connected to the associated guide member by means of double levers so as to be guided for movement relative to the associated guide member.

17. The apparatus of claim 14, wherein between each force measuring device and said base there is disposed a respective support element which is provided with a point or spherical cap-type bearing on to which the respective guide member is arranged to bear.

18. The apparatus of claim 14, wherein each of said introduction plates is adjustable in position in said one plane.

19. The apparatus of claim 14, wherein each force transmission member is provided with a means to which the associated guide member may be attached, whereby the lower end of the associated guide member is maintained a predetermined distance from said base.

20. The apparatus of claim 14 further comprising:

means for measuring a force component causing said moment, said means having a predetermined force introduction point for said force component, said predetermined force introduction point having predetermined distance from said axis;

means for measuring a differential moment caused by a displacement of said object from said predetermined force introduction point to an actual force introduction point, said differential moment acting about an axis running through said predetermined force introduction point and being caused by said force components;

means for correcting said distance between said axis and said predetermined force introduction point by said displacement; and means for determining said at least one moment by multiplying said measured force component by said corrected distance.

* * * * *